United States Patent
Wang et al.

(10) Patent No.: US 11,915,371 B2
(45) Date of Patent: Feb. 27, 2024

(54) METHOD AND APPARATUS OF CONSTRUCTING CHESS PLAYING MODEL

(71) Applicant: OOOK (Beijing) Education and Technology Co., Ltd, Beijing (CN)

(72) Inventors: Kesheng Wang, Beijing (CN); Jin Huang, Beijing (CN); Gang Huang, Beijing (CN); Qiaoling Xu, Beijing (CN); Minglu Cao, Beijing (CN)

(73) Assignee: OOOK (BEIJING) EDUCATION AND TECHNOLOGY CO., LTD, Beijing (CN)

( * ) Notice: Subject to any disclaimer, the term of this patent is extended or adjusted under 35 U.S.C. 154(b) by 135 days.

(21) Appl. No.: 17/522,951

(22) Filed: Nov. 10, 2021

(65) Prior Publication Data
US 2023/0069733 A1    Mar. 2, 2023

(30) Foreign Application Priority Data
Aug. 31, 2021    (CN) .......................... 202111017044.1

(51) Int. Cl.
*G06T 17/20* (2006.01)
*G06T 7/70* (2017.01)
(Continued)

(52) U.S. Cl.
CPC .............. *G06T 17/20* (2013.01); *G06T 7/70* (2017.01); *G06T 19/20* (2013.01); *G06V 40/174* (2022.01);
(Continued)

(58) Field of Classification Search
CPC ..... G06T 17/20; G06T 19/20; G06T 2200/08; G06T 2207/10016; G06T 2207/20084;
(Continued)

(56) References Cited

U.S. PATENT DOCUMENTS

| 2011/0216060 A1* | 9/2011 | Weising .................. A63F 13/00 345/419 |
| 2019/0035149 A1* | 1/2019 | Chen .................... G06V 40/166 |
| 2021/0104100 A1* | 4/2021 | Whitney ................ G06F 3/011 |

FOREIGN PATENT DOCUMENTS

| CN | 107493387 A | 12/2017 |
| CN | 107924579 A | 4/2018 |
| CN | 109325589 B | 6/2021 |

OTHER PUBLICATIONS

Guntz et al., "Multimodal Observation and Interpretation of Subjects Engaged in Problem Solving," 1st Workshop on "Behavior, Emotion and Representation: Building Blocks of Interaction", Oct. 2017, Bielefeld, Germany. 2017. https://doi.org/10.48550/arXiv.1710.04486 (Year: 2017).*

(Continued)

*Primary Examiner* — Sing-Wai Wu
(74) *Attorney, Agent, or Firm* — XSENSUS LLP

(57) ABSTRACT

A method and an apparatus of constructing a chess playing model are disclosed, method includes: acquiring a video image of each chess player; determining a two-dimensional position information for a first expression characterization point in the video image and a marking information for a facial structure characterization point in the first expression characterization point; determining a rotation information for each chess player in a specified direction; reconstructing a three-dimensional reference face model of each chess player so as to generate a three-dimensional target face model of the chess player; reconstructing a three-dimensional target chess player model of the chess player; reconstructing a three-dimensional target chess game model; and reconstructing a three-dimensional target chess playing model.

8 Claims, 6 Drawing Sheets

(51) Int. Cl.
    *G06T 19/20*      (2011.01)
    *G06V 40/16*      (2022.01)
(52) U.S. Cl.
    CPC ............... *G06T 2200/08* (2013.01); *G06T 2207/10016* (2013.01); *G06T 2207/20084* (2013.01); *G06T 2207/30201* (2013.01); *G06T 2219/2016* (2013.01)
(58) Field of Classification Search
    CPC ... G06T 2207/30201; G06T 2219/2016; G06T 7/70; G06V 40/174
    See application file for complete search history.

(56)            References Cited

OTHER PUBLICATIONS

Machine translated CN 107924579 (Year: 2018).*
Office Action dated Jan. 3, 2022, in Taiwan Application No. 11120001550.

* cited by examiner

METHOD AND APPARATUS OF CONSTRUCTING CHESS PLAYING MODEL

CROSS-REFERENCE TO RELATED APPLICATION

This application claims priority from Chinese Application No. 202111017044.1, filed on Aug. 31, 2021, the contents of which are incorporated by reference herein in its entirety.

TECHNICAL FIELD

The present disclosure relates to a field of a computer vision, and in particular to a method and an apparatus of constructing a chess playing model.

BACKGROUND

With a development of a mobile Internet technology, unfamiliar chess players with various styles may be quickly grouped in a chess game on the vast Internet as needed, which may solve fetters of various factors in life and improve a grouping efficiency of a chess game, and further provide a rich and colorful experience for a chess spectator.

However, in a current online chess game, a chess player is generally separated from the chess game. Only a plane effect of a chessboard, occasionally an expression of the chess player, is provided to the chess player and the chess spectator, which may easily lead people into a boring situation and lack a real feeling of an on-site watching.

Therefore, the present disclosure provides a method of constructing a chess playing model to solve one of the above technical problems.

SUMMARY

Some embodiments of the present disclosure provide a method of constructing a chess playing model, comprising:
  acquiring a video image of each chess player at a time point and a distribution relationship information between a chess piece and a chessboard in a chess game at the time point;
  determining a two-dimensional position information for a first expression characterization point in the video image and a marking information for a facial structure characterization point in the first expression characterization point, wherein the first expression characterization point is marked in a facial region of the chess player in the video image;
  determining a rotation information for each chess player in a specified direction based on a two-dimensional position information for the facial structure characterization point and the marking information for the facial structure characterization point of the chess player;
  reconstructing a three-dimensional reference face model of each chess player according to the two-dimensional position information for the first expression characterization point and the rotation information for the chess player, so as to generate a three-dimensional target face model of the chess player;
  reconstructing a three-dimensional target chess player model of the chess player based on the target face model of the chess player and a three-dimensional reference body posture model of the chess player;
  reconstructing a three-dimensional target chess game model according to the distribution relationship information and a three-dimensional reference chess set model; and
  reconstructing a three-dimensional target chess playing model according to the target chess player model, the target chess game model and a reference position relationship simulating a real chess playing scene.

In some embodiments, the determining a rotation information for each chess player in a specified direction based on a two-dimensional position information for the facial structure characterization point and the marking information for the facial structure characterization point of the chess player comprises:
  obtaining, in a facial region of the video image, a facial grid information by using each two-dimensional position information as a vertex position information, according to a connection relationship rule for the marking information; and
  inputting a reference grid information for the chess player and the facial grid information for the chess player into a trained neural network model, so as to acquire the rotation information for the chess player in the specified direction, wherein the reference grid information is obtained based on a two-dimensional position information for a facial structure characterization point in a reference image of the chess player and a marking information for the facial structure characterization point in the reference image of the chess player, and the facial structure characterization point in the video image and the facial structure characterization point in the reference image have a corresponding relationship in a face position of the chess player.

In some embodiments, the reconstructing a three-dimensional reference face model of the chess player according to the two-dimensional position information for the first expression characterization point of the chess player and the rotation information for the chess player, so as to generate a three-dimensional target face model of the chess player comprises:
  rotating a reference face model of each chess player based on the rotation information for the chess player, so as to obtain a first face model of the chess player;
  generating a first facial image of each chess player based on the first face model of the chess player;
  determining a two-dimensional position information for a second expression characterization point in the first facial image, wherein the second expression characterization point is marked in the facial region of the chess player in the first facial image, and the first expression characterization point of the chess player and the second expression characterization point of the chess player have a corresponding relationship in the face position of the chess player;
  obtaining a three-dimensional target position information for each chess player by using the two-dimensional position information for the first expression characterization point and the two-dimensional position information for the second expression characterization point according to the corresponding relationship between the first expression characterization point and the second expression characterization point of the chess player; and
  reconstructing the first face model of the chess player based on the three-dimensional target position information for the chess player, so as to generate the target face model.

In some embodiments, the method further comprising:
  acquiring, prior to playing chess, specific facial images of each chess player photographed at a plurality of specific angles;

determining a two-dimensional position information for a facial structure characterization point in each specific facial image and a marking information for the facial structure characterization point in the specific facial image, wherein the facial structure characterization point is marked in a facial region of the chess player in the specific facial image;

obtaining, in the facial region of the specific facial image, a specific grid information by using each two-dimensional position information as a vertex position information, according to the connection relationship rule for the marking information; and acquiring, based on the specific grid information for each chess player, a reference face model matching a facial structure of the chess player, a reference image matching the facial structure of the chess player and a reference grid information matching the facial structure of the chess player from a reference face model library.

In some embodiments, the specific facial image comprises a front facial image and side facial images on both sides.

Some embodiments of the present disclosure an apparatus of constructing a chess playing model, comprising:

an information acquisition unit configured to acquire a video image of each chess player at a time point and a distribution relationship information between a chess piece and a chessboard in a chess game at the time point;

an information determination unit configured to determine a two-dimensional position information for a first expression characterization point in the video image and a marking information for a facial structure characterization point in the first expression characterization point, wherein the first expression characterization point is marked in a facial region of the chess player in the video image;

a rotation determination unit configured to determine a rotation information for each chess player in a specified direction based on a two-dimensional position information for the facial structure characterization point and the marking information for the facial structure characterization point of the chess player;

a face reconstruction unit configured to reconstruct a three-dimensional reference face model of each chess player according to the two-dimensional position information for the first expression characterization point and the rotation information for the chess player, so as to generate a three-dimensional target face model of the chess player;

a chess player reconstruction unit configured to reconstruct a three-dimensional target chess player model of the chess player based on the target face model of the chess player and a three-dimensional reference body posture model of the chess player;

a chess game reconstruction unit configured to reconstruct a three-dimensional target chess game model according to the distribution relationship information and a three-dimensional reference chess set model; and a chess playing reconstruction unit configured to reconstruct a three-dimensional target chess playing model according to the target chess player model, the target chess game model and a reference position relationship simulating a real chess playing scene.

In some embodiments, the rotation determination unit comprises:

a facial grid acquisition sub-unit configured to obtain, in a facial region of the video image, a facial grid information by using each two-dimensional position information as a vertex position information, according to a connection relationship rule for the marking information; and a rotation determination sub-unit configured to input a reference grid information for the chess player and the facial grid information for the chess player into a trained neural network model, so as to acquire the rotation information for the chess player in the specified direction, wherein the reference grid information is obtained based on a two-dimensional position information for a facial structure characterization point in a reference image of the chess player and a marking information for the facial structure characterization point in the reference image of the chess player, and the facial structure characterization point in the video image and the facial structure characterization point in the reference image have a corresponding relationship in a face position of the chess player.

In some embodiments, the face reconstruction unit comprises:

a rotation sub-unit configured to rotate a reference face model of each chess player based on the rotation information for the chess player, so as to obtain a first face model of the chess player;

an image generation sub-unit configured to generate a first facial image of each chess player based on the first face model of the chess player;

a coordinate determination sub-unit configured to determine a two-dimensional position information for a second expression characterization point in the first facial image, wherein the second expression characterization point is marked in the facial region of the chess player in the first facial image, and the first expression characterization point of the chess player and the second expression characterization point of the chess player have a corresponding relationship in the face position of the chess player;

a coordinate acquisition unit configured to obtain a three-dimensional target position information for each chess player by using the two-dimensional position information for the first expression characterization point and the two-dimensional position information for the second expression characterization point according to the corresponding relationship between the first expression characterization point and the second expression characterization point of the chess player; and a face generation sub-unit configured to reconstruct the first face model of the chess player based on the three-dimensional target position information for the chess player, so as to generate the target face model.

In some embodiments, the apparatus further comprising a reference acquisition unit, wherein the reference acquisition unit comprises:

an image acquisition sub-unit configured to acquire, prior to playing chess, specific facial images of each chess player photographed at a plurality of specific angles;

an information determination sub-unit configured to determine a two-dimensional position information for a facial structure characterization point in each specific facial image and a marking information for the facial structure characterization point in the specific facial image, wherein the facial structure characterization point is marked in a facial region of the chess player in the specific facial image;

a specific grid acquisition sub-unit configured to obtain, in the facial region of the specific facial image, a specific grid information by using each two-dimensional position information as a vertex position information, according to the connection relationship rule for the marking information; and a reference acquisition sub-unit configured to acquire, based on the specific grid information for each chess player, a reference face model matching a facial structure of the chess player, a reference image matching the facial structure of the chess player and a reference grid information matching the facial structure of the chess player from a reference face model library.

In some embodiments, the specific facial image comprises a front facial image and side facial images on both sides.

Compared with a related art, the above solutions of the embodiments of the present disclosure have at least the following beneficial effects.

The present disclosure provides a method and an apparatus of constructing a chess playing model. The present disclosure may be implemented to obtain an expression characterization point and a facial structure characterization point in a facial region of each chess player through a video image of the chess player, generate a rotation information based on the facial structure characterization point, then generate a target face model of the chess player through the expression characterization point and the rotation information, then generate a target chess player model and a target chess game model, and then generate a chess playing model. According to the present disclosure, a university and an efficiency of data processing may be improved, a three-dimensional effect of a simulated chess playing may be achieved, and an immersive user experience of the chess spectator may be improved.

DETAILED DESCRIPTION OF EMBODIMENTS

Figure 1:
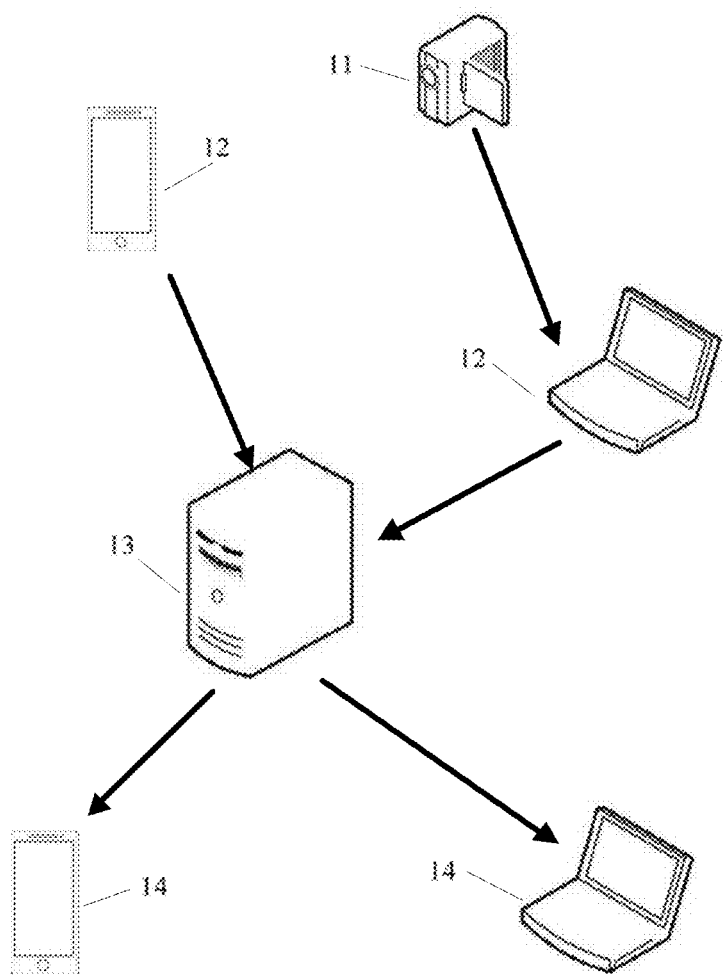
FIG. 1 shows a schematic diagram of a system for a method of constructing a chess playing model according to some embodiments of the present disclosure.

In order to make objectives, technical solutions and advantages of the present disclosure clearer, the present disclosure will be further described in detail below with reference to the drawings. Obviously, the embodiments described are only a part but not all of the embodiments of the present disclosure. Based on the embodiments in the present disclosure, all other embodiments obtained by those of ordinary skilled in the art without inventive effort fall within the protection scope of the present disclosure.

Terms used in the embodiments of the present disclosure are only for the purpose of describing specific embodiments, and are not intended to limit the present disclosure. The singular forms of "a", "said" and "the" used in the embodiments of the present disclosure and the appended claims are also intended to include plural forms, unless the context clearly indicates other meanings, and "a plurality of" generally means at least two.

It should be understood that the term "and/or" herein only describes an association relationship of associated objects, which means that there may be three relationships. For example, A and/or B may refer to only A, only B, and both A and B. In addition, a symbol "/" herein generally indicates an "or" relationship of associated objects.

It should be understood that although the terms "first", "second", "third", etc. may be used in the embodiments of the present disclosure, these descriptions should not be limited to these terms. These terms are only used to distinguish the descriptions. For example, without departing from the scope of the embodiments of the present disclosure, the first may also be referred to as the second, and similarly, the second may also be referred to as the first.

Depending on the context, the word "if" as used herein may be interpreted as "when" or "in response to determining" or "in response to detecting". Similarly, depending on the context, the phrase "if it is determined" or "if it is detected (a condition or an event recited)" may be interpreted as "when it is determined" or "in response to determining" or "when it is detected (the condition or the event recited)" or "in response to detecting (the condition or the event recited)".

It should be further noted that the terms "include", "contain" or any other variants thereof are intended to cover non-exclusive inclusion, so that a product or apparatus including a series of elements not only includes those elements, but also includes other elements not clearly listed of, or further includes elements inherent to this product or apparatus. If there are no more restrictions, the element defined by "including a (an) . . . " does not exclude the existence of other identical elements in the product or apparatus that includes the element.

Optional embodiments of the present disclosure will be described in detail below with reference to the drawings. It is particularly noted that in the following embodiments, "J51", "J52", "J60", "J61" and "J62" represent marking information for facial structure characterization points.

The embodiment of the present disclosure may be applied to a chess playing scene of a variety of chess, such as Chinese chess, International chess, Army chess, and Go chess. The chess playing scene includes an on-site chess playing scene and an online chess playing scene. A chess spectator may watch online, through a terminal, a chess playing process shown in real time by a three-dimensional animation generated by a chess playing model.

As shown in FIG. 1, an acquisition terminal 12 and a display terminal 14 include, but are not limited to, a mobile phone, a tablet computer, or a personal computer.

For example, for the on-site chess playing scene in which chess players face to face to play chess, each chess player is provided with a camera device 11 to shoot a facial video of the chess player, and another camera device 11 is provided to shoot a video of a chessboard. These videos may be acquired by the acquisition terminal 12 (such as a computer) and transmitted to a server 13, which may perform an initial processing on these videos. The server 13 may have a function of identifying a distribution relationship information between a chess piece and the chessboard. The display terminal 14 may build a chess playing model based on the initial processing information, and generate a corresponding three-dimensional animation to display to the spectator.

For example, for the online chess playing scene in which each chess player participating in the game may play chess via the Internet, each chess player is provided with a camera device 11 (such as a camera in a mobile phone or an external or built-in camera in a computer) to shoot a facial video of the chess player. These videos may be acquired by the acquisition terminal 12 and transmitted to the server 13. The chess game is an electronic chess game controlled by the server 13, and the distribution relationship information between the chess piece and the chessboard may be automatically generated. The server 13 may perform an initial processing on the videos and the electronic chess game. The display terminal 14 may build a chess playing model based on the initial processing information, and generate a corresponding three-dimensional animation to display to the spectator.

Certainly, in the above two examples, other devices in the network (such as the server 13) may be used to construct the chess playing model based on the initial processing information, and transmit the generated three-dimensional animation to the display terminal 14.

Figure 2:
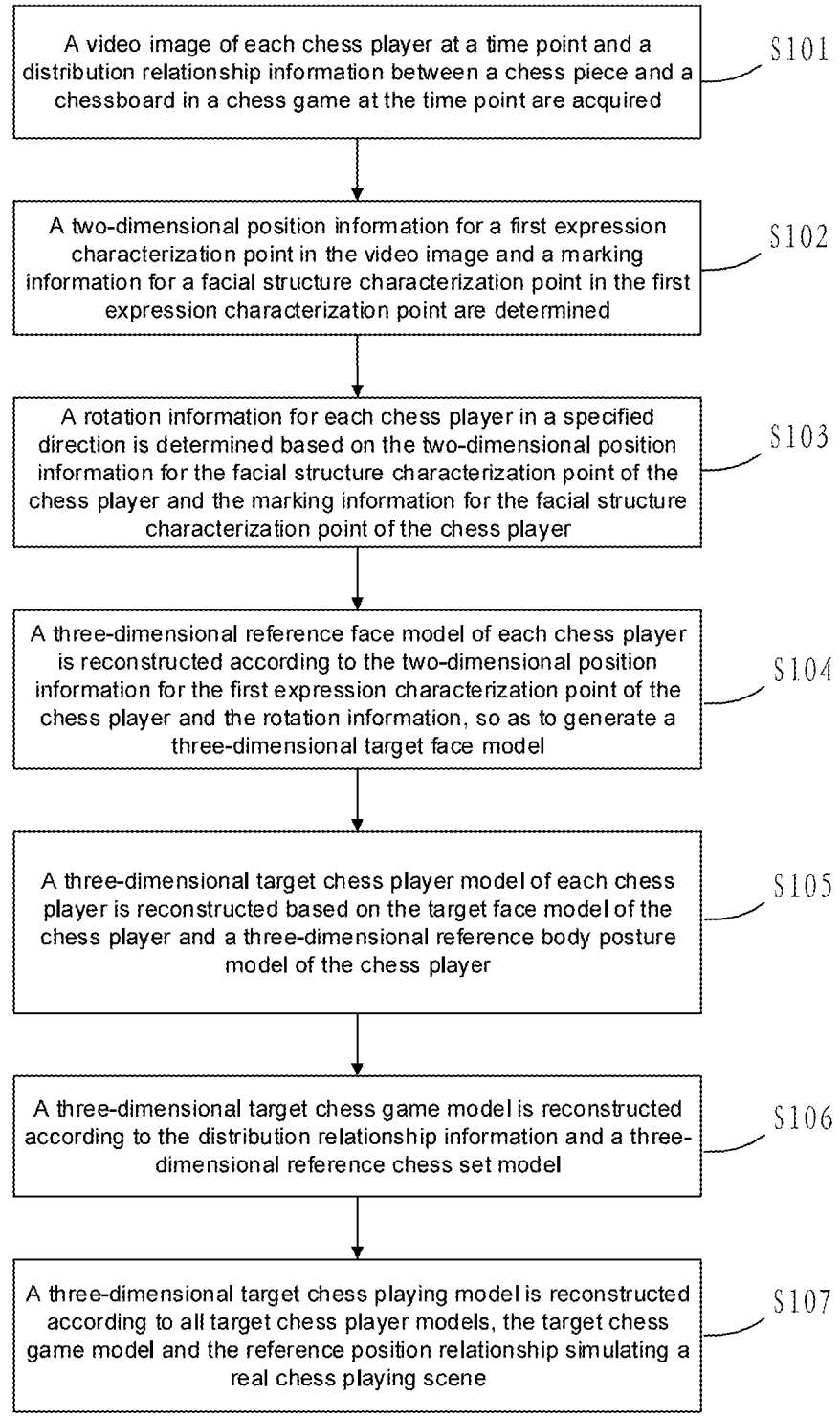
FIG. 2 shows a flowchart of a method of constructing a chess playing model according to some embodiments of the present disclosure.

An embodiment provided in the present disclosure, that is, an embodiment of a method of constructing a chess playing model, will be described in detail below with reference to FIG. 2.

In step S101, a video image of each chess player at a time point and a distribution relationship information between a chess piece and a chessboard in a chess game at the time point are acquired.

In order to ensure a video synchronization, the acquisition terminal 12 is generally time-synchronized prior to a production of the video. A common and accurate time synchronization method for an online device is to synchronize time with a network time server. Each acquisition terminal 12 after the time synchronization may generate an absolutely accurate time point. However, a relatively accurate time point may also meet a requirement of the chess playing model. That is, each acquisition terminal 12 may be time-synchronized with a device which may be a server or a terminal and which does not necessarily have an accurate time. When making a video, a time stamp may be added to the video based on the time point after the time synchronization, so that video images at the same time point may be acquired from videos from a plurality of sources based on the time stamp during a video processing. For example, in the online chess playing scene, each chess player may participate in the game in front of a time-synchronized mobile phone or computer. The mobile phone or computer may add a time stamp to the facial video of the chess player shot by a camera of the mobile phone or computer, and transmit the facial video to the server 13. The server 13 may perform an initial processing on the facial video and the electronic chess game so as to obtain an initial processing information. That is, the server 13 may acquire the video image of each player at the time point based on the time stamp in each facial video, and acquire the distribution relationship information between the chess piece and the chessboard at the time point from the electronic chess game.

The distribution relationship information between the chess piece and the chessboard in the chess game includes a position information of a chessboard format, an identification information of the chess piece, and a position information of the chess piece. In a case of the on-site chess playing scene, the server may identify the distribution relationship information through the chess game video. In a case of the online game scene, the server may automatically generate the distribution relationship information through the electronic chess game controlled by the server.

In the embodiment of the present disclosure, the chess playing model is constructed based on the initial processing information described above.

In step S102, a two-dimensional position information for a first expression characterization point in the video image and a marking information for a facial structure characterization point in the first expression characterization point are determined.

Figure 3A:
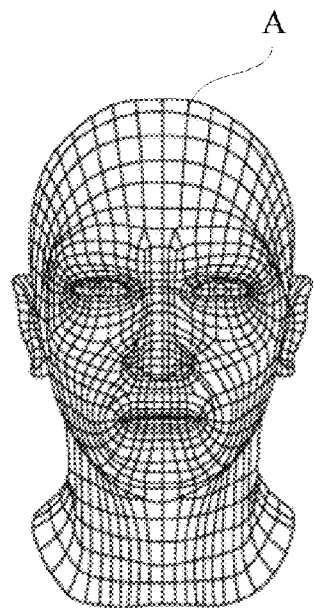
FIG. 3A shows a schematic diagram of an expression characterization point in an image according to some embodiments of the present disclosure.

The expression characterization point is marked in a facial region of the chess player in the image. The first expression characterization point belongs to the expression characterization point, and the first expression characterization point is an expression characterization point in the video image. As shown in FIG. 3A, an intersection of lines is an expression characterization point A. A main purpose of providing the expression characterization point is to show an expression of the chess player through the expression characterization point. The number of expression characterization points may be increased or decreased as needed. However, in a chess player image acquired from any angle, all expression characterization points have a corresponding relationship in a face position of the chess player. That is, the corresponding relationship mean that each expression characterization point in chess player images has the same position on a face of the chess player, rather than that each expression characterization point in chess player images has the same two-dimensional position information. For example, the expression characterization point in a first image of the chess player and the expression characterization point in a second image of the chess player are both located at a left inner corner of eye in the facial region of the chess player. Therefore, the expression characterization point in the first image of the chess player and the expression characterization point in the second image of the chess player have a corresponding relationship in the face position of the chess player.

Figure 3B:
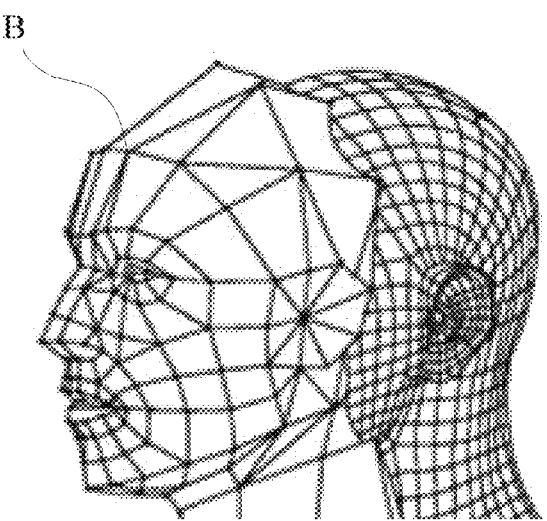
FIG. 3B shows a schematic diagram of a facial structure characterization point in an image according to some embodiments of the present disclosure.

The expression characterization point may include a facial structure characterization point that may reflect a facial posture of the chess player. As shown in FIG. 3B, a node in a sparse grid protruding to the left is a facial structure characterization point B in the expression characterization point. The facial structure characterization point may contain a marking information for indicating a position feature of the face of the chess player corresponding to the two-dimensional position information, and the position feature is an inherent feature of the face of the chess player. For example, the facial structure characterization point at the left inner corner of eye is marked as "J51", and the facial structure characterization point at a right inner corner of eye is marked as "J52". When the facial structure characterization points are less than the expression characterization points, the efficiency of data processing may be improved. Optionally, the facial structure characterization point may include a facial feature and a facial shape characterization point.

In step S103, a rotation information for each chess player in a specified direction is determined based on the two-dimensional position information for the facial structure characterization point of the chess player and the marking information for the facial structure characterization point of the chess player.

The rotation information is used to represent a rotation information of a rotation of a head of the chess player in the specified direction in a real scene, which may be understood as a deviation angle in the specified direction. For example, in spatial coordinates, the specified direction may be a positive direction of X-axis, a positive direction of Y-axis, and a positive direction of Z-axis, and the rotation information may contain an angle of rotation around the X-axis, an angle of rotation around the Y-axis, and an angle of rotation around the Z-axis.

Figure 4:
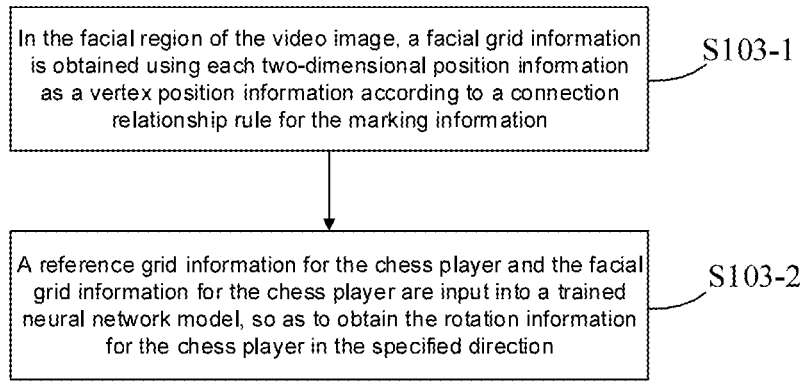
FIG. 4 shows a flowchart of a method of determining a rotation information provided according to some embodiments of the present disclosure.

In a specific embodiment, as shown in FIG. 4, the determining a rotation information for each chess player in a specified direction based on the two-dimensional position information for the facial structure characterization point of the chess player and the marking information for the facial structure characterization point of the chess player includes the following specific steps.

In step S103-1, in the facial region of the video image, a facial grid information is obtained using each two-dimensional position information as a vertex position information according to a connection relationship rule for the marking information.

The connection relationship rule stipulates a connection relationship between the marking information. For example, the connection relationship rule stipulates that the marking information "J52" is connected to the marking information "J60", "J61" and "J62". Therefore, in the facial region of the video image, the two-dimensional position information corresponding to the marking information "J52", "J60", "J61" and "J62" may be connected as the vertex position information of the grid, so as to generate the facial grid information.

The facial grid information includes a two-dimensional position information and a marking information for each grid vertex, and a two-dimensional position information and a marking information for an adjacent grid vertex connected to the grid vertex.

In step S103-2, a reference grid information for the chess player and the facial grid information for the chess player are input into a trained neural network model, so as to obtain the rotation information for the chess player in the specified direction.

The reference grid information is obtained based on the two-dimensional position information and the marking information for the facial structure characterization point in a reference image of the chess player.

Prior to playing chess, the acquisition terminal 12 may acquire, by using specific facial images of the chess player photographed at a plurality of specific angles, a reference face model, a reference image and a reference grid information of the chess player, which are mainly used as comparison data to analyze the facial expression and posture of the chess player, so as to generate a three-dimensional chess playing model through the two-dimensional video image.

The facial structure characterization point in the video image and the facial structure characterization point in the reference image have a corresponding relationship in the face position of the chess player. For example, the facial structure characterization point in the first image of the chess player and the facial structure characterization point in the second image of the chess player are both located in the left inner corner of eye in the face position of the chess player. Therefore, the facial structure characterization point in the first image of the chess player and the facial structure characterization point in the second image of the chess player have a corresponding relationship in the face position of the chess player.

This specific embodiment may be implemented to determine the positional relationship between the facial structure characterization point of the reference grid information and the facial structure characterization point of the facial grid information by using the corresponding relationship, and then acquire the rotation information for the chess player in the specified direction through a trained neural network model. In this way, a tedious three-dimensional calculation may be reduced, a processing efficiency of the chess playing model may be improved, and the user experience of the chess spectator may be improved.

In step S104, a three-dimensional reference face model of each chess player is reconstructed according to the two-dimensional position information for the first expression characterization point of the chess player and the rotation information, so as to generate a three-dimensional target face model.

Figure 5:
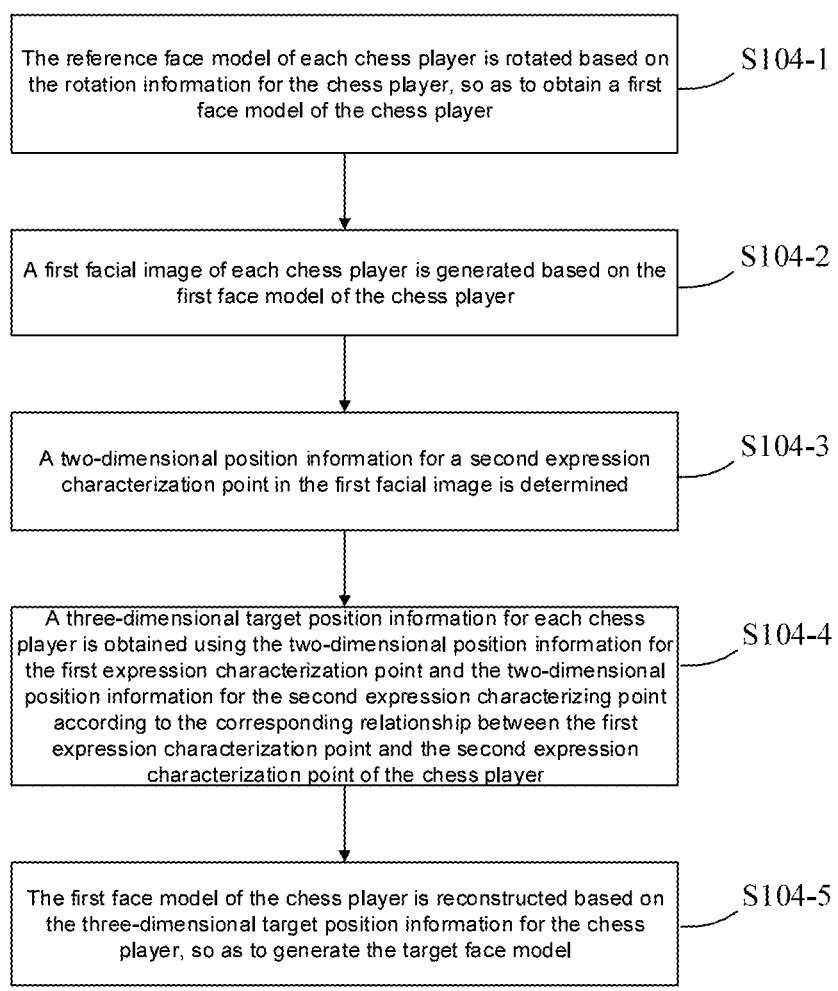
FIG. 5 shows a flowchart of a method of generating a target face model provided according to some embodiments of the present disclosure.

In a specific embodiment, as shown in FIG. 5, the reconstructing a three-dimensional reference face model of each chess player according to the two-dimensional position information for the first expression characterization point of the chess player and the rotation information, so as to generate a three-dimensional target face model includes the following specific steps.

In step S104-1, the reference face model of each chess player is rotated based on the rotation information for the chess player, so as to obtain a first face model of the chess player.

The reference face model is not rotated in the specified direction. In order to match a posture of the reference face model with a real facial posture of the chess player, the embodiment of the present disclosure may be implemented to perform a rotation processing on the reference face model.

In step S104-2, a first facial image of each chess player is generated based on the first face model of the chess player.

The first facial image is a two-dimensional image of a reference face model in a current facial posture. The facial posture of the chess player in the first facial image is the same as the facial posture of the chess player in the video image, but the facial expressions are different.

In step S104-3, a two-dimensional position information for a second expression characterization point in the first facial image is determined.

The second expression characterization point belongs to the expression characterization point, and the second expression characterization point is the expression characterization point in the first facial image. The second expression characterization point is marked in the facial region of the chess player in the first facial image.

The first expression characterization point and the second expression characterization point of each chess player have a corresponding relationship in the face position of the chess player.

In step S104-4, a three-dimensional target position information for each chess player is obtained using the two-dimensional position information for the first expression characterization point and the two-dimensional position information for the second expression characterizing point according to the corresponding relationship between the first expression characterization point and the second expression characterization point of the chess player.

For example, by using the two-dimensional position information for the first expression characterization point and the two-dimensional position information for the second expression characterization point, the three-dimensional target position information for the chess player may be obtained by Expression (1) and Expression (2).

$$\arg\min\|X_{3d}\text{-}X_{2d}\| \qquad \text{Expression (1)}$$

$$X_{3d}=p(M_{keypoint}) \qquad \text{Expression (2)}$$

where $X_{3d}$ represents the three-dimensional target position information for the chess player, $M_{keypoint}$ represents the two-dimensional position information for the second expression characterization point, p represents a projection function, such as a perspective projection function or an orthogonal projection function, and $X_{2d}$ represents the two-dimensional position information for the first expression characterization point.

In step S104-5, the first face model of the chess player is reconstructed based on the three-dimensional target position information for the chess player, so as to generate the target face model.

For example, the target face model of the chess player may be expressed by Expression (3).

$$M=\overline{M}+A_{id}P_{id}+A_{exp}P_{exp} \qquad \text{Expression (3)}$$

where M represents the target face model; $\overline{M}$ represents the first face model, $\overline{M}\in R3\times 1$, N represents the number of coordinate points represented by the three-dimensional target position information; $A_{id}P_{id}$ represents an identity offset item, $A_{id}\in R^{3N\times m_{id}}$, $A_{id}$ represents a mid-dimensional identity base, $P_{id}$ represents an identity parameter; $A_{exp}P_{exp}$ represents an expression offset item, $A_{exp}\in R^{3N\times m_{exp}}$, $A_{exp}$ represents an $m_{exp}$-dimensional expression base, and $P_{exp}$ represents an expression parameter.

In step S105, a three-dimensional target chess player model of each chess player is reconstructed based on the target face model of the chess player and a three-dimensional reference body posture model of the chess player.

Prior to playing chess, each chess player may select a favorite reference body posture model from a reference body posture model library. For example, the chess player may select a reference body posture model in Hanfu. The reference body posture model does not include a face model, and the reference body posture model may be combined with the target face model of the chess player so as to generate a target chess player model with a current facial expression of the chess player. In this way, the chess spectator may watch a virtual chess player.

In step S106, a three-dimensional target chess game model is reconstructed according to the distribution relationship information and a three-dimensional reference chess set model.

Since the chess piece and the chessboard have a fixed shape, the three-dimensional chess piece model and chessboard model may be acquired from the reference chess set model in a reference chess set model library. The target chess game model may be reconstructed based on the distribution relationship information between the chess piece and the chessboard in the chess game. For example, the distribution relationship information between the chess piece and the chess board in Go game includes the position information of the chessboard format, the identification information of the chess piece and the position information of the chess piece. The position information of the chessboard format may indicate each chess piece placement position by using a number. For example, if the chess piece placement position includes "30", and a white chess is placed on the "30" position of the chessboard, then the position information of the white chess is "30", and the identification information of the white chess is the number 1 representing the white chess.

The step S106 may be performed subsequent to step S101 and prior to step S105, which is not limited in the embodiments of the present disclosure.

In step S107, a three-dimensional target chess playing model is reconstructed according to all target chess player models, the target chess game model and the reference position relationship simulating a real chess playing scene.

In a real scene, a chess player position may be different in different chess games. For example, in Go chess, the chessboard is located between the chess players, and the chess players face each other; while in Siguo Army chess, the players are around the chessboard. The reference position relationship may pre-set the position of the chessboard, the position of the chess player and the direction of the player's body according to different chess games. In this way, a three-dimensional virtual chess playing scene similar to the real scene may be reconstructed.

The embodiment of the present disclosure further provides a method of constructing a reference information (such as the reference face model, the reference image, and the reference grid information) of each chess player prior to playing chess.

Figure 6:
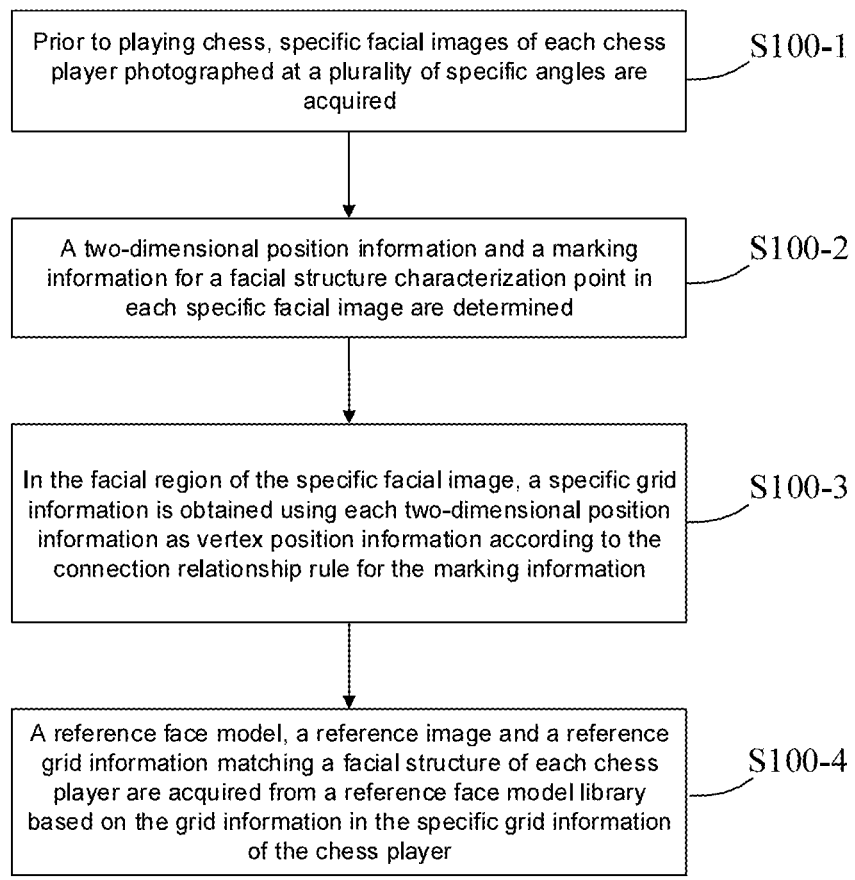
FIG. 6 shows a flowchart of a method of constructing a reference information provided according to some embodiments of the present disclosure.

In a specific embodiment, as shown in FIG. 6, the method includes the following steps.

In step S100-1, prior to playing chess, specific facial images of each chess player photographed at a plurality of specific angles are acquired.

For the online chess playing scene, the "prior to playing chess" may refer to before the chess player enters the electronic chess game room, or when the electronic game player is registered. For the on-site game scene, the "prior to playing chess" may refer to the time of registration. The embodiments of the present disclosure do not make specific limitations.

Optionally, the specific facial image includes a front facial image and side facial images on both sides. These three images may contain facial features of the chess player and may reduce an amount of data processing, so that the chess playing efficiency may be improved.

In step S100-2, the two-dimensional position information and the marking information for the facial structure characterization point in each specific facial image are determined.

The facial structure characterization point is marked in the facial region of the chess player in the specific facial image.

The facial structure characterization point in the specific facial image and the facial structure characterization point in the chess player image described above have a corresponding relationship in the face position of the chess player.

In step S100-3, in the facial region of the specific facial image, a specific grid information is obtained using each two-dimensional position information as vertex position information according to the connection relationship rule for the marking information.

In step S100-4, a reference face model, a reference image and a reference grid information matching a facial structure of each chess player are acquired from a reference face model library based on the grid information in the specific grid information of the chess player.

The reference face model library includes reference information for various people and facial grid information for the various people. The facial grid information for a person is generated from the facial images of the person photographed at a plurality of specific angles.

In this specific embodiment, the facial grid information in the reference face model library is retrieved through the specific grid information in the plurality of specific facial images of the chess player. When the specific grid information matches the facial grid information in the library, the reference information corresponding to the facial grid information in the library may be used as the reference information matching the facial structure of the chess player. The reference information is obtained through a plurality of two-dimensional specific facial images, which may simplify data acquisition steps and improve the university and efficiency of data processing.

The embodiment of the present disclosure may be implemented to obtain the expression characterization point and the facial structure characterization point of the facial region of each chess player through the video image of the chess player, generate the rotation information based on the facial structure characterization point, then generate the target face model of the chess player through the expression characterization point and the rotation information, then generate the target chess player model and the target chess playing model, and then generate the chess playing model. In this way, the university and efficiency of data processing may be improved, the three-dimensional effect of the simulated chess playing may be achieved, and the immersive user experience of the chess spectator may be improved.

The present disclosure further provides an apparatus embodiment corresponding to the embodiments described above, so as to implement the method steps described in the above embodiments. The explanation based on the meaning of the same name is the same as the above embodiments, and has the same technical effect as the above embodiments, which will not be repeated here.

Figure 7:
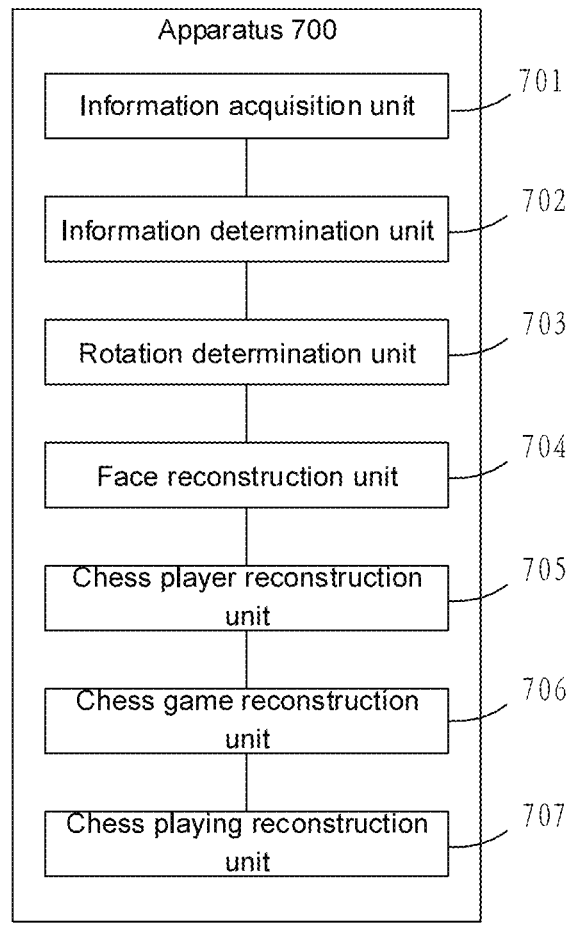
FIG. 7 shows a unit block diagram of an apparatus of constructing a chess playing model according to some embodiments of the present disclosure.

As shown in FIG. 7, the present disclosure provides an apparatus 700 of constructing a chess playing model, including:
  an information acquisition unit 701 used to acquire a video image of each chess player at a time point and a distribution relationship information between a chess piece and a chessboard in a chess game at the time point;
  an information determination unit 702 used to determine a two-dimensional position information for a first expression characterization point in the video image and a marking information for a facial structure characterization point in the first expression characterization point, wherein the first expression characterization point is marked in a facial region of the chess player in the video image;
  a rotation determination unit 703 used to determine a rotation information for each chess player in a specified direction based on a two-dimensional position information for the facial structure characterization point and the marking information for the facial structure characterization point of the chess player;
  a face reconstruction unit 704 used to reconstruct a three-dimensional reference face model of each chess player according to the two-dimensional position information for the first expression characterization point and the rotation information for the chess player, so as to generate a three-dimensional target face model of the chess player;
  a chess player reconstruction unit 705 used to reconstruct a three-dimensional target chess player model of the chess player based on the target face model of the chess player and a three-dimensional reference body posture model of the chess player;
  a chess game reconstruction unit 706 used to reconstruct a three-dimensional target chess game model according to the distribution relationship information and a three-dimensional reference chess set model; and
  a chess playing reconstruction unit 707 used to reconstruct a three-dimensional target chess playing model according to the target chess player model, the target chess game model and a reference position relationship simulating a real chess playing scene.

Optionally, the rotation determination unit 703 includes:
  a facial grid acquisition sub-unit used to obtain, in a facial region of the video image, a facial grid information by using each two-dimensional position information as a vertex position information, according to a connection relationship rule for the marking information; and
  a rotation determination sub-unit used to input a reference grid information for the chess player and the facial grid information for the chess player into a trained neural network model, so as to acquire the rotation information for the chess player in the specified direction, wherein the reference grid information is obtained based on a two-dimensional position information for a facial structure characterization point in a reference image of the chess player and a marking information for the facial structure characterization point in the reference image of the chess player, and the facial structure characterization point in the video image and the facial structure characterization point in the reference image have a corresponding relationship in a face position of the chess player.

Optionally, the face reconstruction unit 704 includes:
  a rotation sub-unit used to rotate a reference face model of each chess player based on the rotation information for the chess player, so as to obtain a first face model of the chess player;
  an image generation sub-unit used to generate a first facial image of each chess player based on the first face model of the chess player;
  a coordinate determination sub-unit used to determine a two-dimensional position information for a second expression characterization point in the first facial image, wherein the second expression characterization point is marked in the facial region of the chess player in the first facial image, and the first expression characterization point of the chess player and the second expression characterization point of the chess player have a corresponding relationship in the face position of the chess player;
  a coordinate acquisition unit used to obtain a three-dimensional target position information for each chess player by using the two-dimensional position information for the first expression characterization point and the two-dimensional position information for the second expression characterization point according to the corresponding relationship between the first expression characterization point and the second expression characterization point of the chess player; and
  a face generation sub-unit used to reconstruct the first face model of the chess player based on the three-dimensional target position information for the chess player, so as to generate the target face model.

Optionally, the apparatus further includes a reference acquisition unit, and the reference acquisition unit includes:

an image acquisition sub-unit used to acquire, prior to playing chess, specific facial images of each chess player photographed at a plurality of specific angles;

an information determination sub-unit used to determine a two-dimensional position information for a facial structure characterization point in each specific facial image and a marking information for the facial structure characterization point in the specific facial image, wherein the facial structure characterization point is marked in a facial region of the chess player in the specific facial image;

a specific grid acquisition sub-unit used to obtain, in the facial region of the specific facial image, a specific grid information by using each two-dimensional position information as a vertex position information, according to the connection relationship rule for the marking information; and a reference acquisition sub-unit used to acquire, based on the specific grid information for each chess player, a reference face model matching a facial structure of the chess player, a reference image matching the facial structure of the chess player and a reference grid information matching the facial structure of the chess player from a reference face model library.

Optionally, the specific facial image includes a front facial image and side facial images on both sides.

The embodiment of the present disclosure may be implemented to obtain the expression characterization point and the facial structure characterization point of the facial region of each chess player through the video image of the chess player, generate the rotation information based on the facial structure characterization point, then generate the target face model of the chess player through the expression characterization point and the rotation information, then generate the target chess player model and the target chess playing model, and then generate the chess playing model. In this way, the university and efficiency of data processing may be improved, the three-dimensional effect of the simulated chess playing may be achieved, and the immersive user experience of the chess spectator may be improved.

Figure 8:
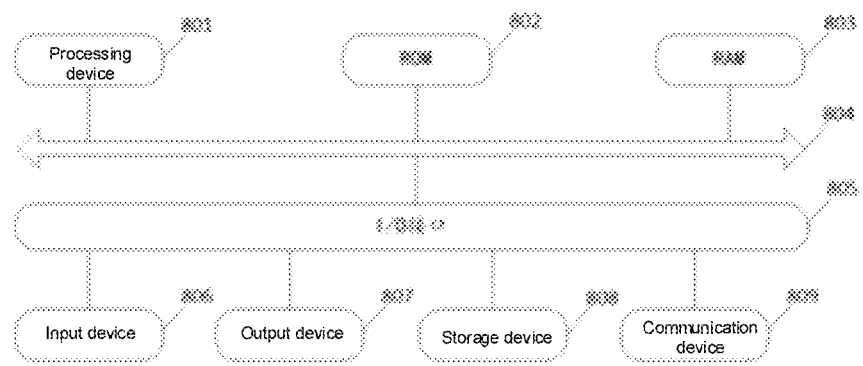
FIG. 8 shows a schematic diagram of a connection structure of an electronic apparatus according to some embodiments of the present disclosure.

As shown in FIG. 8, the embodiment of the present disclosure provides an electronic apparatus, including: at least one processor; and a memory communicatively connected to the at least one processor, wherein the memory stores instructions executable by the at least one processor, and the instructions, when executed by the at least one processor, cause the at least one processor to implement the method steps in the embodiments described above.

The embodiment of the present disclosure provides a non-transitory computer storage medium having computer-executable instructions stored thereon. The computer-executable instructions may execute the method steps in the embodiments described above.

Referring to FIG. 8, a schematic structural diagram of an electronic apparatus suitable for implementing the embodiments of the present disclosure is shown. The terminal device in the embodiments of the present disclosure may include, but are not limited to, a mobile terminal such as a mobile phone, a notebook computer, a digital broadcast receiver, a PDA (personal digital assistant), a PAD (tablet computer), a PMP (portable multimedia player), a vehicle-mounted terminal (such as a vehicle navigation terminal) and so on, and a fixed terminal such as a digital TV, a desktop computer, and so on. The electronic apparatus shown in FIG. 8 is only an example, and should not bring any limitation to the function and scope of use of the embodiments of the present disclosure.

As shown in FIG. 8, the electronic apparatus may include a processing device (e.g., a central processor, a graphics processor, etc.) which may execute various appropriate actions and processing according to a program stored in a read only memory (ROM) 802 or a program loaded into a random access memory (RAM) 808 from a storage device 803. Various programs and data required for the operation of the electronic apparatus are stored in the RAM 803. The processing device 801, the ROM 802 and the RAM 803 are connected to each other through a bus 804. An input/output (I/O) interface 805 is further connected to the bus 804.

Generally, devices that may be connected to the I/O interface 805 may include: an input device 806 such as a touch screen, a touch pad, a keyboard, a mouse, a camera, a microphone, an accelerometer, a gyroscope, etc.; an output device 805 such as a liquid crystal display (LCD), a speaker, a vibrator, etc.; a storage device 808 such as a magnetic tape, a hard disk, etc.; and a communication device 809. The communication device 809 may allow the electronic apparatus to perform wireless or wired communication with other apparatuses to exchange data. Although FIG. 8 shows an electronic apparatus having various devices, it should be understood that it is not required to implement or have all the devices shown. More or fewer devices may be alternatively implemented or provided.

In particular, according to the embodiments of the present disclosure, the process described above with reference to the flowchart may be implemented as a computer software program. For example, the embodiments of the present disclosure include a computer program product including a computer program carried on a computer readable medium. The computer program contains a program code for execution of the method shown in the flowchart. In such an embodiment, the computer program may be downloaded and installed from the network through the communication device 809, or installed from the storage device 808, or installed from the ROM 802. When the computer program is executed by the processing device 801, the above-mentioned functions defined in the method of the embodiments of the present disclosure are performed.

It should be noted that the computer readable medium in the present disclosure may be a computer readable signal medium, a computer readable storage medium, or any combination thereof. The computer readable storage medium may be, for example, but not limited to, an electric, magnetic, optical, electromagnetic, infrared or semiconductor system, apparatus or device, or any combination thereof. More specific examples of the computer readable storage medium may include, but are not limited to: electrical connections with one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the above. In the present disclosure, the computer readable storage medium may be any tangible medium that contains or stores programs that may be used by or in combination with an instruction execution system, apparatus or device. In the present disclosure, the computer readable signal medium may include a data signal propagated in a baseband or as a part of a carrier wave, and a computer-readable program code is carried therein. This propagated data signal may take many forms, including but not limited to electromagnetic signals, optical signals, or any suitable combination of the above. The computer readable signal medium may also be any computer readable medium other than the computer readable storage medium. The computer readable medium may send, propagate, or transmit the program for use by or in combination with the instruction execution system, apparatus, or device. The program code contained on the computer readable medium may be transmitted by any suitable medium, including but not limited to: wireless, wired, optical cable, radio frequency signals, etc., or any suitable combination of the above.

The computer readable medium may be contained in the electronic apparatus, or exist alone without being assembled into the electronic apparatus.

The computer program code used to perform the operations of the present disclosure can be written in one or more programming languages or a combination thereof. The above-mentioned programming languages include object-oriented programming languages—such as Java, Smalltalk, C++, and also conventional Procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, the remote computer can be connected to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more for realizing the specified logical function Executable instructions. It should also be noted that, in some alternative implementations, the functions marked in the block may also occur in a different order from the order marked in the drawings. For example, two blocks shown in succession can actually be executed substantially in parallel, and they can sometimes be executed in the reverse order, depending on the functions involved. It should also be noted that each block in the block diagram and/or flowchart, and the combination of the blocks in the block diagram and/or flowchart, can be implemented by a dedicated hardware-based system that performs the specified functions or operations Or it can be realized by a combination of dedicated hardware and computer instructions.

The units involved in the embodiments of the present disclosure may be implemented in software or hardware. In some cases, the name of the unit does not constitute a limitation to the unit.

What is claimed is:

1. A method of constructing a chess playing model, comprising:
    acquiring a video image of each chess player at a time point and a distribution relationship information between a chess piece and a chessboard in a chess game at the time point;
    determining a two-dimensional position information for a first expression characterization point in the video image and a marking information for a facial structure characterization point in the first expression characterization point, wherein the first expression characterization point is marked in a facial region of the chess player in the video image;
    determining a rotation information for each chess player in a specified direction based on a two-dimensional position information for the facial structure characterization point and the marking information for the facial structure characterization point of the chess player;
    reconstructing a three-dimensional reference face model of each chess player according to the two-dimensional position information for the first expression characterization point and the rotation information for the chess player, so as to generate a three-dimensional target face model of the chess player;
    reconstructing a three-dimensional target chess player model of the chess player based on the target face model of the chess player and a three-dimensional reference body posture model of the chess player; and
    reconstructing a three-dimensional target chess game model according to the distribution relationship information and a three-dimensional reference chess set model; and
    reconstructing a three-dimensional target chess playing model according to the target chess player model, the target chess game model and a reference position relationship simulating a real chess playing scene,
    wherein the determining a rotation information for each chess player in a specified direction based on a two-dimensional position information for the facial structure characterization point and the marking information for the facial structure characterization point of the chess player comprises:
    obtaining, in a facial region of the video image, a facial grid information by using each two-dimensional position information as a vertex position information, according to a connection relationship rule for the marking information; and
    inputting a reference grid information for the chess player and the facial grid information for the chess player into a trained neural network model, so as to acquire the rotation information for the chess player in the specified direction, wherein the reference grid information is obtained based on a two-dimensional position information for a facial structure characterization point in a reference image of the chess player and a marking information for the facial structure characterization point in the reference image of the chess player, and the facial structure characterization point in the video image and the facial structure characterization point in the reference image have a corresponding relationship in a face position of the chess player.

2. The method of claim 1, wherein the reconstructing a three-dimensional reference face model of the chess player according to the two-dimensional position information for the first expression characterization point of the chess player and the rotation information for the chess player, so as to generate a three-dimensional target face model of the chess player comprises:
    rotating a reference face model of each chess player based on the rotation information for the chess player, so as to obtain a first face model of the chess player;
    generating a first facial image of each chess player based on the first face model of the chess player;
    determining a two-dimensional position information for a second expression characterization point in the first facial image, wherein the second expression characterization point is marked in the facial region of the chess player in the first facial image, and the first expression characterization point of the chess player and the second expression characterization point of the chess player have a corresponding relationship in the face position of the chess player;

obtaining a three-dimensional target position information for each chess player by using the two-dimensional position information for the first expression characterization point and the two-dimensional position information for the second expression characterization point according to the corresponding relationship between the first expression characterization point and the second expression characterization point of the chess player; and reconstructing the first face model of the chess player based on the three-dimensional target position information for the chess player, so as to generate the target face model.

3. The method of claim 1, further comprising:

acquiring, prior to playing chess, specific facial images of each chess player photographed at a plurality of specific angles;

determining a two-dimensional position information for a facial structure characterization point in each specific facial image and a marking information for the facial structure characterization point in the specific facial image, wherein the facial structure characterization point is marked in a facial region of the chess player in the specific facial image;

obtaining, in the facial region of the specific facial image, a specific grid information by using each two-dimensional position information as a vertex position information, according to the connection relationship rule for the marking information; and acquiring, based on the specific grid information for each chess player, a reference face model matching a facial structure of the chess player, a reference image matching the facial structure of the chess player and a reference grid information matching the facial structure of the chess player from a reference face model library.

4. The method of claim 3, wherein the specific facial image comprises a front facial image and side facial images on both sides.

5. An apparatus of constructing a chess playing model, comprising:

an information acquisition unit configured to acquire a video image of each chess player at a time point and a distribution relationship information between a chess piece and a chessboard in a chess game at the time point;

an information determination unit configured to determine a two-dimensional position information for a first expression characterization point in the video image and a marking information for a facial structure characterization point in the first expression characterization point, wherein the first expression characterization point is marked in a facial region of the chess player in the video image;

a rotation determination unit configured to determine a rotation information for each chess player in a specified direction based on a two-dimensional position information for the facial structure characterization point and the marking information for the facial structure characterization point of the chess player;

a face reconstruction unit configured to reconstruct a three-dimensional reference face model of each chess player according to the two-dimensional position information for the first expression characterization point and the rotation information for the chess player, so as to generate a three-dimensional target face model of the chess player;

a chess player reconstruction unit configured to reconstruct a three-dimensional target chess player model of the chess player based on the target face model of the chess player and a three-dimensional reference body posture model of the chess player;

a chess game reconstruction unit configured to reconstruct a three-dimensional target chess game model according to the distribution relationship information and a three-dimensional reference chess set model; and a chess playing reconstruction unit configured to reconstruct a three-dimensional target chess playing model according to the target chess player model, the target chess game model and a reference position relationship simulating a real chess playing scene, wherein the rotation determination unit comprises:

a facial grid acquisition sub-unit configured to obtain, in a facial region of the video image, a facial grid information by using each two-dimensional position information as a vertex position information, according to a connection relationship rule for the marking information; and a rotation determination sub-unit configured to input a reference grid information for the chess player and the facial grid information for the chess player into a trained neural network model so as to acquire the rotation information for the chess player in the specified direction, wherein the reference grid information is obtained based on a two-dimensional position information for a facial structure characterization point in a reference image of the chess player and a marking information for the facial structure characterization point in the reference image of the chess player, and the facial structure characterization point in the video image and the facial structure characterization point in the reference image have a corresponding relationship in a face position of the chess player.

6. The apparatus of claim 5, wherein the face reconstruction unit comprises:

a rotation sub-unit configured to rotate a reference face model of each chess player based on the rotation information for the chess player, so as to obtain a first face model of the chess player;

an image generation sub-unit configured to generate a first facial image of each chess player based on the first face model of the chess player;

a coordinate determination sub-unit configured to determine a two-dimensional position information for a second expression characterization point in the first facial image, wherein the second expression characterization point is marked in the facial region of the chess player in the first facial image, and the first expression characterization point of the chess player and the second expression characterization point of the chess player have a corresponding relationship in the face position of the chess player;

a coordinate acquisition unit configured to obtain a three-dimensional target position information for each chess player by using the two-dimensional position information for the first expression characterization point and the two-dimensional position information for the second expression characterization point according to the corresponding relationship between the first expression characterization point and the second expression characterization point of the chess player; and a face generation sub-unit configured to reconstruct the first face model of the chess player based on the three-dimensional target position information for the chess player, so as to generate the target face model.

7. The apparatus of claim 5, further comprising a reference acquisition unit, wherein the reference acquisition unit comprises:

an image acquisition sub-unit configured to acquire, prior to playing chess, specific facial images of each chess player photographed at a plurality of specific angles;

an information determination sub-unit configured to determine a two-dimensional position information for a facial structure characterization point in each specific facial image and a marking information for the facial structure characterization point in the specific facial image, wherein the facial structure characterization point is marked in a facial region of the chess player in the specific facial image;

a specific grid acquisition sub-unit configured to obtain, in the facial region of the specific facial image, a specific grid information by using each two-dimensional position information as a vertex position information, according to the connection relationship rule for the marking information; and a reference acquisition sub-unit configured to acquire, based on the specific grid information for each chess player, a reference face model matching a facial structure of the chess player, a reference image matching the facial structure of the chess player and a reference grid information matching the facial structure of the chess player from a reference face model library.

8. The apparatus of claim 7, wherein the specific facial image comprises a front facial image and side facial images on both sides.

* * * * *